US011520412B2

(12) United States Patent
Primavesi et al.

(10) Patent No.: US 11,520,412 B2
(45) Date of Patent: Dec. 6, 2022

(54) DATA INPUT SYSTEM/EXAMPLE GENERATOR

(71) Applicant: Microsoft Technology Licensing, LLC, Redmond, WA (US)

(72) Inventors: Alexander Gautam Primavesi, London (GB); Piotr Jerzy Holc, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 15/450,581

(22) Filed: Mar. 6, 2017

(65) Prior Publication Data

US 2018/0253153 A1    Sep. 6, 2018

(51) Int. Cl.
| | | |
|---|---|---|
| *G06F 3/023* | (2006.01) | |
| *G06F 3/04886* | (2022.01) | |
| *G06F 40/30* | (2020.01) | |
| *G06F 40/242* | (2020.01) | |
| *G06F 40/274* | (2020.01) | |
| *G06F 40/289* | (2020.01) | |

(52) U.S. Cl.
CPC ........ *G06F 3/0237* (2013.01); *G06F 3/04886* (2013.01); *G06F 40/242* (2020.01); *G06F 40/274* (2020.01); *G06F 40/289* (2020.01); *G06F 40/30* (2020.01)

(58) Field of Classification Search
CPC ............... G06F 3/0237; G06F 3/04886; G06F 17/2735; G06F 17/276; G06F 17/2775; G06F 17/2785; G06F 40/242; G06F 40/274; G06F 40/289; G06F 40/30
See application file for complete search history.

(56) References Cited

U.S. PATENT DOCUMENTS

| | | | |
|---|---|---|---|
| 2004/0201607 A1 | 10/2004 | Mulvey et al. | |
| 2011/0087961 A1 | 4/2011 | Fitusi et al. | |
| 2011/0202876 A1* | 8/2011 | Badger | G06F 3/0237 |
| | | | 715/816 |
| 2012/0297294 A1* | 11/2012 | Scott | G06F 17/273 |
| | | | 715/261 |

(Continued)

FOREIGN PATENT DOCUMENTS

| | | | |
|---|---|---|---|
| CA | 2805723 A1 | 8/2014 | |
| WO | 2016095051 A1 | 6/2016 | |
| WO | WO-2017006104 A1 * | 1/2017 | ........... G06N 3/0445 |

OTHER PUBLICATIONS

Arnold, et al., "On Suggesting Phrases vs. Predicting Words for Mobile Text Composition", In Proceedings of the 29th Annual Symposium on User Interface Software and Technology, Oct. 16, 2016, 6 pages.

(Continued)

*Primary Examiner* — Maryam M Ipakchi
(74) *Attorney, Agent, or Firm* — Schwegman Lundberg & Woessner, P.A.

(57) ABSTRACT

A computer-implemented example generator is described which has a memory storing a text item, examples of use of the text item having been requested. A processor searches at least one n-gram language model to identify n-grams containing the text item. The processor is configured to rank the identified n-grams on the basis of a position of the text item in the identified n-grams; and a user interface presents at least some of the identified n-grams to a user taking into account the ranking.

17 Claims, 5 Drawing Sheets

(56) References Cited

U.S. PATENT DOCUMENTS

| | | | |
|---|---|---|---|
| 2012/0297332 A1 | 11/2012 | Changuion et al. | |
| 2013/0325438 A1* | 12/2013 | Griffin | G06F 17/273 704/9 |
| 2014/0267045 A1 | 9/2014 | Grieves et al. | |
| 2015/0100537 A1* | 4/2015 | Grieves | G06N 5/025 706/52 |
| 2015/0347383 A1 | 12/2015 | Willmore et al. | |
| 2016/0041965 A1* | 2/2016 | Ghassabian | G06F 3/005 715/261 |
| 2016/0179967 A1* | 6/2016 | Sa | G06F 16/3346 707/730 |
| 2016/0292148 A1* | 10/2016 | Aley | G06F 17/276 |
| 2016/0371250 A1 | 12/2016 | Rhodes | |
| 2017/0154055 A1* | 6/2017 | Dimson | G06F 16/5838 |
| 2017/0249291 A1* | 8/2017 | Patel | G06F 40/274 |
| 2018/0204120 A1* | 7/2018 | Rei | G06N 3/0445 |

OTHER PUBLICATIONS

Basu, Saikat, "How to Auto-Complete Sentences, Text in Windows with PhraseExpress", http://www.guidingtech.com/8124/auto-complete-text-sentences-windows-phraseexpress/, Published on: Aug. 14, 2013, 9 pages.

Nandi, et al., "Assisted Querying using Instant-Response Interfaces", In Proceedings of the 2007 ACM SIGMOD International Conference on Management of Data, Jun. 11, 2007, pp. 1156-1158.

"International Search Report and Written Opinion Issued in PCT Application No. PCT/US2018/019795", dated May 25, 2018, 13 Pages.

"Office Action Issued In European Patent Application No. 18711450.9", dated May 14, 2021, 7 Pages.

* cited by examiner

DATA INPUT SYSTEM/EXAMPLE GENERATOR

BACKGROUND

Data input systems such as predictive virtual keyboards, predictive speech input systems and others are increasingly used to enter information into electronic devices and computing systems. Where electronic devices have a small form factor it can be burdensome for users to manually type in data using virtual keyboards. Where speech input is difficult due to background environment noise and/or the need to avoid disturbing others it is burdensome to speak individual data items for input.

Data input systems which use predictive technology to predict candidate next data input items are increasingly available. These include predictive virtual keyboards and other data input systems which offer candidate next data items, such as words, phrases, sentences, emoji, images, stickers, emoticons and others for the user to select. The user can then give a single input action such as a speech input, touch input or other modality of input to input the candidate data item.

Users often have a problem understanding new text items in a language, such as new emoji, new hashtags and new phrases. Understanding infrequently used or rare words and phrases is also difficult for many users. For example, names of people, dialect and specialist language such as medical terminology, scientific terms and acronyms. Existing approaches for finding meanings of text items involve the user navigating to a specialist dictionary web site and manually entering the term concerned. For example, where a user receives a text message containing an emoji that the user does not understand, the user typically needs to move out of the messaging application and into a web browser application. The user then needs to navigate to an emoji dictionary service and copy and paste the emoji into the query box in order to find meanings of the emoji.

The embodiments described below are not limited to implementations which solve any or all of the disadvantages of known data input systems/example generators.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In some example, a computer-implemented example generator is described which has a memory storing a text item, examples of use of the text item having been requested. A processor searches at least one n-gram language model to identify n-grams containing the text item. The processor is configured to rank the identified n-grams on the basis of a position of the text item in the identified n-grams; and a user interface presents at least some of the identified n-grams to a user taking into account the ranking.

In various examples there is a data input system of an electronic device which has a user interface which receives one or more context text items in a sequence of text items input by a user. The data input system has a processor which uses at least one n-gram language model and the context text items to predict a next item in the sequence of text items. The user interface is able to receive a request for examples of use of one of the predicted next items. The processor is configured to search the n-gram language model to identify n-grams comprising the one of the predicted next items.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a virtual keyboard text entry system, or an e-reader, the system described is provided as an example and not a limitation. As those skilled in the art will appreciate, the present examples are suitable for application in a variety of different types of data input/example generator systems including but not limited to: browsers, e-readers, document authoring applications, predictive keyboards and others. Data may be input using any modality including speech, touch, gesture, pointing and others.

Figure 1:
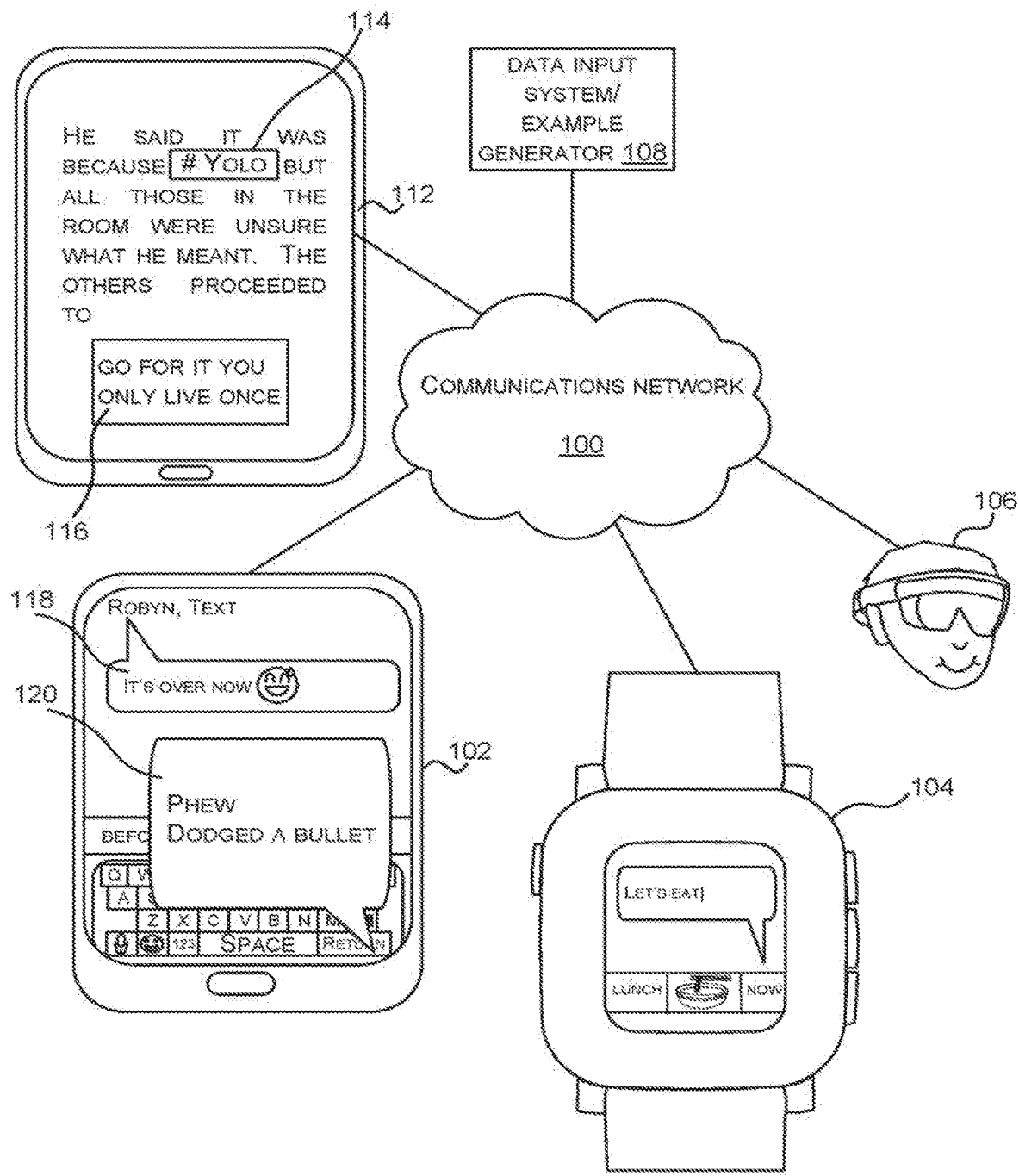
FIG. 1 is a schematic diagram of a data input system/example generator used with a variety of electronic devices.

FIG. 1 is a schematic diagram of a smart phone 102 with a virtual keyboard, a smart watch 104 with a virtual keyboard, an augmented reality head-worn computing device 106, and an e-reader 112. The augmented reality head-worn computing device 106 displays a virtual keyboard to the user and the user is able to select keys of the virtual keyboard using eye movements, finger pointing, speech commands or in other ways.

The smart phone 102, smart watch 104, augmented reality head worn-device 106, and e-reader 112 are examples of electronic devices where example generators are used to understand the meaning of text items and/or input data although other electronic devices may be used with the technology described herein. Each of the electronic devices 102, 104, 106, 112 either comprises a data input system/example generator 108 or has access to a data input system/example generator 108 via a communications network 100.

The data input system/example generator 108 comprises n-gram language model technology and in some examples the data input system/example generator 108 is integral with a virtual keyboard. However, this is not essential as the data input system/example generator 108 uses any technology which generates examples of use of a given text item, for example, to facilitate input of the text item to an electronic device. The functionality of the data input system/example generator 108 is described in more detail below and it may be shared between an electronic device 102, 104, 106, 112 and a data input system/example generator 108 in the cloud in some examples. The data input system/example generator 108 is implemented using one or more of: software, hardware, firmware.

Using the data input system/example generator 108 the user is able to find the meaning of and/or input text comprising characters, words, emoji, emoticons, hash tags, pictograms and other text items. For example, if a user encounters a text item that he or she does not understand, he or she is able to use the present technology to quickly and simply generate examples of use of the text item. This enables the user to understand the meaning of the text item and optionally decide whether to proceed to enter the text item into the electronic device. In various examples this is achieved without the need to navigate away from a current application which the user is operating and from which the text item was encountered. The user is able to quickly and simply enter the text item to the electronic device in the case where the meaning is as required.

In the example of FIG. 1 the smart phone 102 is executing a messaging application which has a virtual predictive keyboard. A text message has been received from Robyn which says "It's over now" together with an emoji that the user of the smart phone 102 does not understand. The user long touches the emoji to indicate that examples of use of the emoji are requested. The data input system/example generator 108 operates to compute examples of use of the emoji and these are displayed in a pop up or overlay panel 120. In this case the examples of use are "phew" and "dodged a bullet". Note that in this case the examples of use do not comprise the emoji itself. In this way the user quickly and simply finds the meaning of the emoji without having to navigate away from the messaging application. More detail about how the examples of use of the emoji are computed is given later with reference to FIGS. 3 and 4.

In the smart phone 104 example of FIG. 1 the user of the smart phone is creating a new text message and so far as input the words "let's eat". The data input system/example generator 108 has computed candidate next items for the text message and three candidate next text items are offered which are "lunch", an emoji and "now". The user does not understand what the emoji means. The user makes a long touch on the emoji to indicate that examples of use of the emoji are requested. The data input system/example generator computes examples of use of the emoji and these are presented in an overlay panel (not shown in FIG. 1). The examples of use are "ramen", "noodles" and "pho". The user now understands the emoji and decides to input the emoji to the text message. The use is able to do this in a fast, simple manner by selecting the emoji candidate button, by making a selection in the overlay panel, or by making speech input or in other ways. This is achieved without the need to move away from the messaging application on the smart watch, for example to an emoji dictionary web site.

In the e-reader 112 example of FIG. 1 the user of the e-reader is reading an electronic book comprising the text "He said it was because #YOLO but all those in the room were unsure what he meant. The others proceeded to . . . ". The user does not know the meaning of the hash tag "#YOLO" and selects the text item comprising the hashtag 114 as indicated in FIG. 1. For example, by making a long touch on the text item. The data input system/example generator 108 computes examples of use of the hashtag and presents these in an overlay panel 116. In this case the examples are "go for it" and "you only live once".

In the case that the data input system 108 is in the cloud, the electronic device such as the smart phone 102 sends the text item for which examples of use are required to the data input system 108 in the cloud. The data input system 108 computes the examples of use using one or more n-gram language models and sends these to the electronic device. Other variations on this scheme are possible where various different parts of the data input system/example generator functionality is located at the electronic device itself.

Alternatively, or in addition, the functionality of the data input system/example generator 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
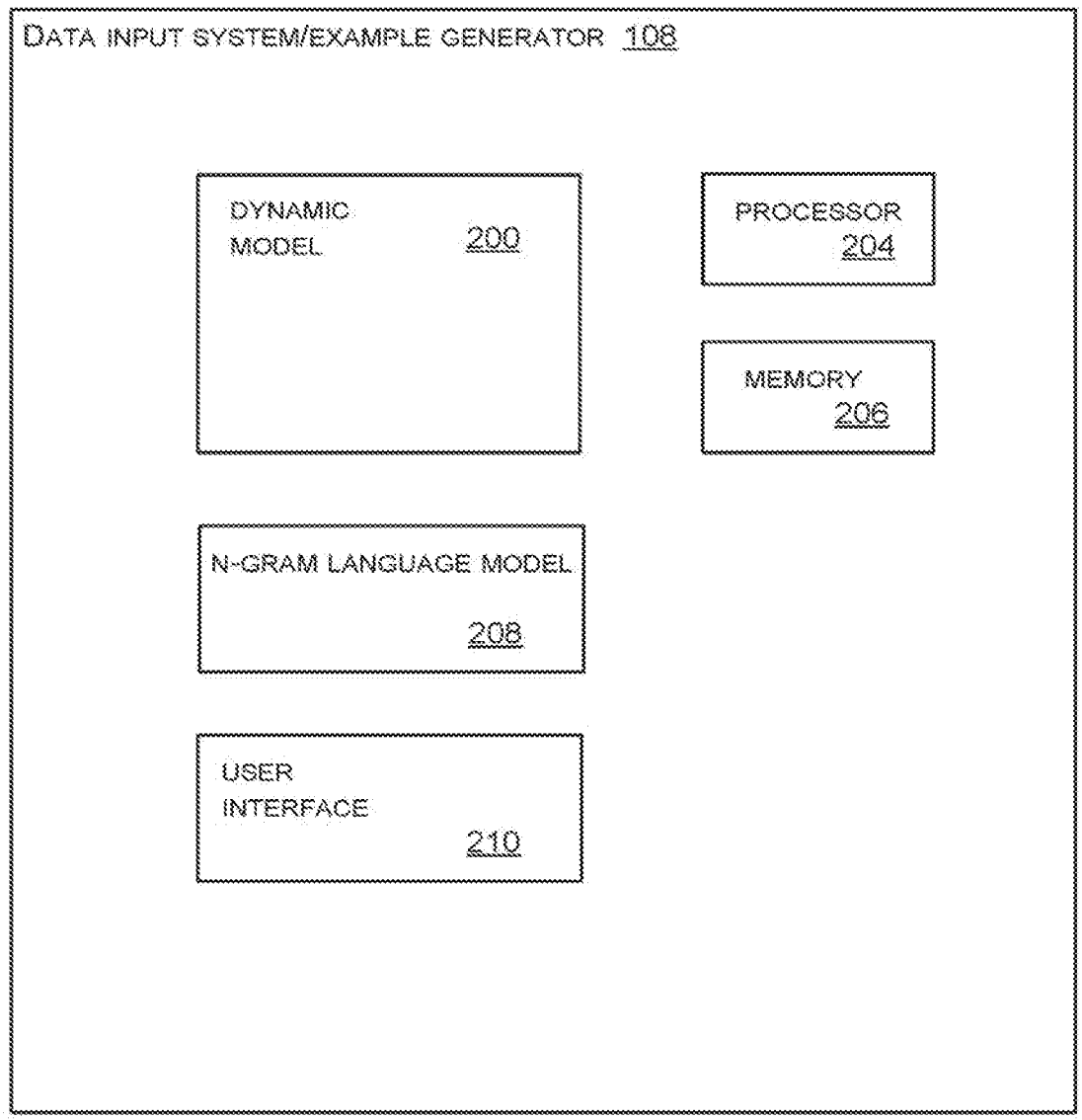
FIG. 2 is a schematic diagram of the data input system/example generator of FIG. 1 in more detail.

FIG. 2 shows the data input system/example generator 108 in more detail. The data input system has one or more processors 204, a memory 206, at least one n-gram language model 208, an optional dynamic model 200 and a user interface 210. The processors and memory are described in more detail below with reference to FIG. 5.

The n-gram language model is a predictor comprising a plurality of n-grams extracted from a corpus of training documents such as emails, text messages, web pages, books, or other documents. Individual n-grams of the model have probabilities computed from frequencies of observation of the n-grams in the corpus of documents. In some cases the probabilities are smoothed so that they sum to one. An n-gram is a group of two or more text items observed as contiguous in the corpus of documents. For example a two-gram of words observed in the immediately previous sentence of this document is "text items". The text items may be words, morphemes, phonemes, or other text items including parts of spoken words. An n-gram language model is typically used as a predictor by taking context text items in a sequence of text items and identifying n-grams in the language model comprising the context text items and which are longer than the context text items. In this way predicted text items are found which are present in the identified n-grams and which are potential next text items in the sequence of text items. By way of example only, the n-gram language model 208 may be an English n-gram language model, a Spanish n-gram language model, a medical terminology n-gram language model, a dialect n-gram language model, or any other n-gram language model.

The data input system/example generator 108 optionally has at least one dynamic model 200 where a dynamic model is bespoke to a user and comprises n-grams of text items used by that user. N-grams are added to the dynamic model on an ongoing basis as new n-grams are observed associated with the user, for example, by being in a web page the user browses, by being in an email the user receives, by being in a message the user authors, by being in a document the user authors, or in other ways. The data input system 108 has dynamic models for many different individual users in some cases and is able to select which dynamic model to use in a particular situation according to identifiers of the individual users.

In some cases the data input system/example generator 108 has a user interface 212 for example, to display an overlay panel containing examples of use of an emoji that the user has requested a meaning for. In some cases the user interface comprises a virtual keyboard panel and candidate keys together with an overlay panel for displaying examples of use of offered candidates. In some cases the user interface is part of an augmented reality display system. In some cases the user interface presents examples of use in an auditory manner and/or receives spoken user input.

Figure 3:
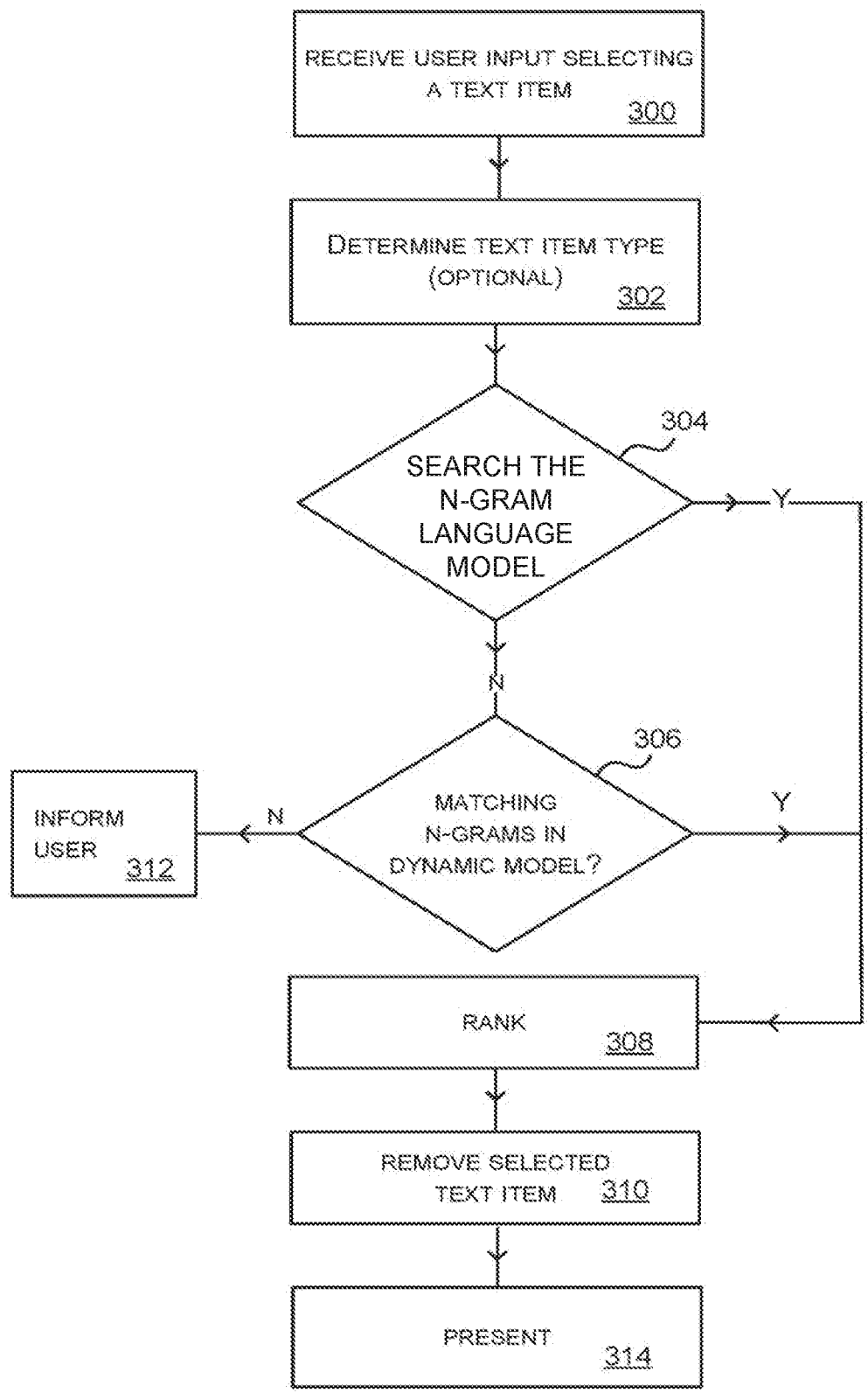
FIG. 3 is a flow diagram of a method of operation at the data input system/example generator of FIG. 2.

FIG. 3 is a flow diagram of a method of operation of the data input system/example generator 108. User input is received 300 selecting a text item for which examples of use are required. For example a user makes a speech command to select the text item which is visible using augmented reality headset 106. In another example a user makes a touch input at a touch screen of smart phone 102 or smart watch 104 to select an emoji in a text message 118 that the user has received and does not understand. In another example a user makes a selection of a hash tag 114 using a stylus input at a touch screen of e-reader 112. In some cases a long touch user input is used to select the text item for which examples of use are desired. By using a long touch user input it is possible to distinguish between different types of action requested in respect of a text item. For example, in cases where the text item is a candidate prediction of a virtual keyboard, offered on a candidate key, the user is able to long press the candidate key to obtain an overlay panel with examples of use of the candidate. If the user makes a shorter press of the candidate key the candidate prediction is input to the electronic device.

The data input system/example generator 108 optionally determines a type of the selected text item. For example, to determine whether the text item is an emoji, emoticon, sticker, gif, hashtag, or other type of text item. In some examples, to determine the type of the selected text item the data input system/example generator 108 examines a unicode representation of the text item. Optical character recognition is used if appropriate, to convert the glyphs of the text item into unicode. By examining the unicode representation it is possible to determine if the text item is an emoji, emoticon, sticker, gif, or hashtag.

The data input system/example generator 108 searches 304 the n-gram language model to find any n-grams in the model which contain the text item. If n-grams are found the method proceeds to operation 308.

If no n-grams are found in the n-gram language model which contain the text item, then a search 306 is made in the dynamic model. Often for new text items, such as new emoji or new hashtags, the text items will not appear in the n-gram language model which is relatively static. For example, the n-gram language model may be updated every month or quarter of a year. If one or more n-grams containing the text item are found in the dynamic model the process proceeds to operation 308. Otherwise the user is informed 312 that no examples of use are available for the text item.

In the example of FIG. 3 the search in the dynamic model only happens if the search in the n-gram language model is unsuccessful. This gives a benefit of speed since only one search is carried out. However, in other examples both the dynamic model and the n-gram language model are searched and the results amalgamated with any duplicates being removed. This gives the benefit of improved results in the case of new text items since the dynamic model is more likely to obtain examples of new text items. It is possible for the search of the dynamic model to comprise a search of a plurality of dynamic models of other users where appropriate user consents have been obtained.

The ranking process 308 comprises ordering the identified n-grams. If the type of the text item was an emoji or hashtag then the identified n-grams are ranked according to a position of the text item in the n-gram. For example, n-grams where the text item occurs as the last term of the n-gram are given a higher ranking than other identified n-grams in the case where the text item is an emoji or hashtag. For example, where the text item is a word, n-grams where the word occurs at the beginning of the identified n-gram are given a higher ranking than n-grams where the word occurs at the end of the identified n-gram. This gives the benefit that more meaningful examples are generated for the user. Generally, identified n-grams are given a higher ranking the longer they are. So a 5-gram would have a higher ranking than a 3-gram. This also gives the benefit that more meaningful examples are generated for the user.

In some examples the data input system/example generator 108 removes 310 the text item from the ranked n-grams. For example, if the n-grams comprise an emoji which is the emoji the user wants to find a meaning for, the emoji itself is removed from the n-grams before those are presented to the user.

The top n ranked n-grams are presented 314 to the user, for example, by being put in an overlay panel or pop up window over an application which is currently executing at the electronic device. In some cases the top n ranked n-grams are presented in an auditory manner using one or more loudspeakers.

Figure 4:
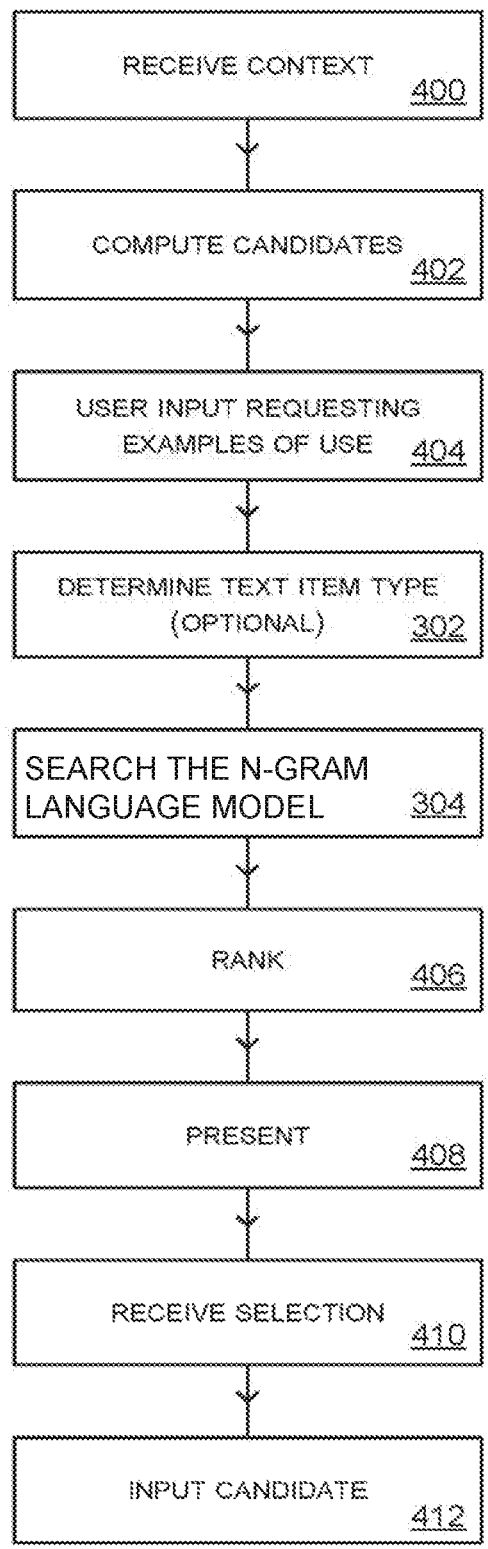
FIG. 4 is a flow diagram of another method of operation at the data input system/example generator of FIG. 2.

FIG. 4 is a flow diagram of a method of inputting data to an electronic device and where the method incorporates a method of generating examples of use of a text item such as described with reference to FIG. 3.

Context is received at the data input system/example generator 108. For example, the context comprises one or more text items in a sequence of text items that have already been input by the user. In the smart watch example of FIG. 1 the context comprises the words "let's eat". Using the context the data input system/example generator 108 computes candidate next text items in the sequence and offers three candidates to the user in the example of FIG. 1 for the smart watch, where the candidates are "lunch", an emoji, and "now". The candidates are computed using one or more language models such as n-gram language models. Suppose the user does not know the meaning of the emoji (or other text item) which has been offered as a candidate. The user is unsure whether to select that candidate. The user is able to give user input 404 such as a long press on the candidate button offering the emoji to request examples of use of that emoji (or other text item).

The data input system/example generator 108 determines 302 a type of the text item for which the user has requested examples of use. For example, a unicode representation of the text item is examined and found to indicate that the text item is an emoji (in the example of FIG. 1 for the smart watch). The data input system/example generator searches 304 the n-gram language model (such as the one which was used to compute the candidates at operation 402) to find n-grams containing the text item for which examples of use have been requested. The identified n-grams are then ranked 406 as described with reference to FIG. 3. For example, in the case of an emoji, n-grams with an emoji as the last item in the n-gram are ranked higher. The top k n-grams are selected and presented 408 to the user at an overlay panel (not shown in FIG. 1 for clarity). The user is then able to make a selection of a candidate to enter the candidate into the electronic device such as the smart watch. The selection is received 410 as a result of a selection of a candidate button by touching the candidate button, by speaking a command, by making an eye movement, by pointing with a finger, or in other ways. In some cases the selection is done by selecting within the overlay panel itself. Once the selection is received 410 the selected candidate is input 412 to the electronic device.

Figure 5:
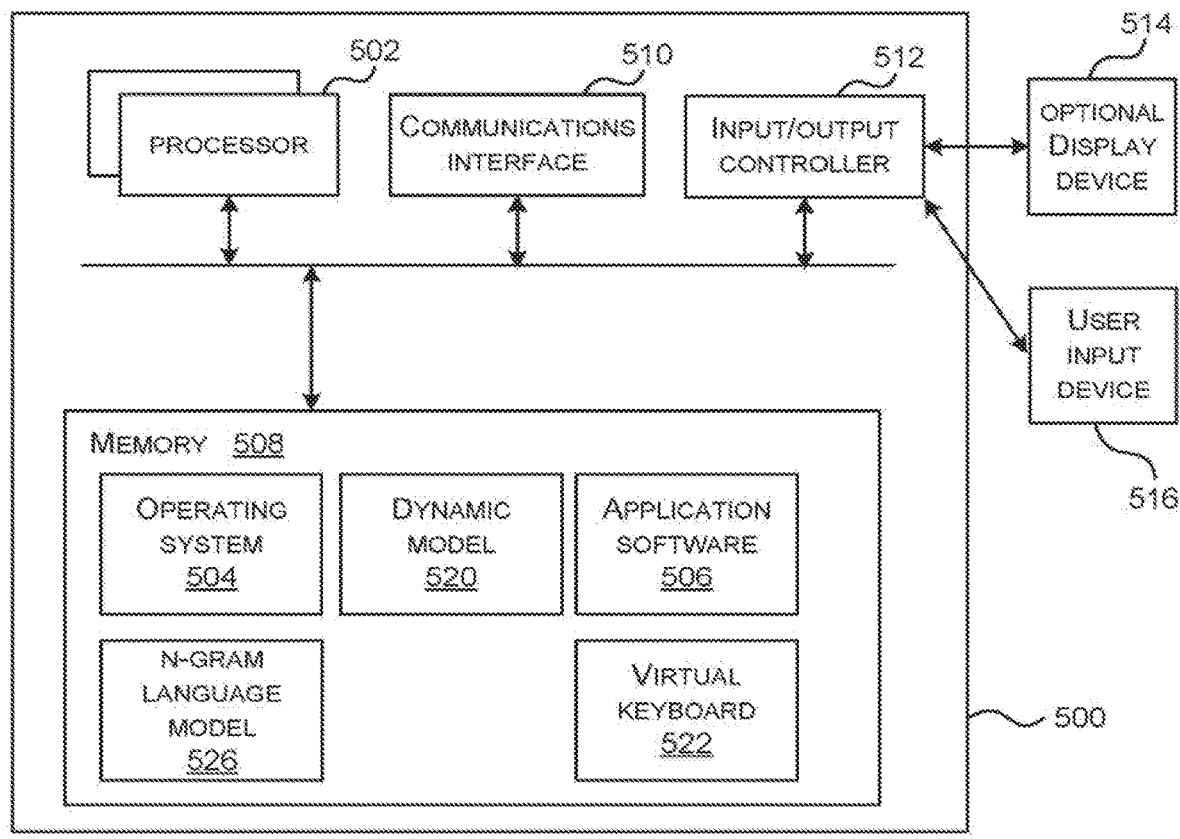
FIG. 5 illustrates an exemplary computing-based device in which embodiments of a data input system/example generator are implemented.

FIG. 5 illustrates various components of an exemplary computing-based device 500 which are implemented as any form of a computing and/or electronic device, and in which embodiments of a data input system/example generator 108 are implemented in some examples.

Computing-based device 500 comprises one or more processors 502 which are microprocessors, controllers or any other suitable type of processors for processing computer executable instructions to control the operation of the device in order to find examples of use of text items and/or facilitate data entry to the computing-based device 500. In some examples, for example where a system on a chip architecture is used, the processors 502 include one or more fixed function blocks (also referred to as accelerators) which implement a part of the method of FIG. 3 in hardware (rather than software or firmware). Platform software comprising an operating system 504 or any other suitable platform software is provided at the computing-based device to enable application software 506 to be executed on the device. The application software may comprise a messaging application, a content authoring application, an information retrieval application, a document reader, a web browser, or others where data is to be either input by the user or understood by a user. The computing-based device 500 has a dynamic model 520, an n-gram language model 526, and optionally a virtual keyboard 522.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 510 which is a network card, transceiver or other communication interface).

The computing-based device 500 also comprises an input/output controller 512 arranged to output display information to a display device 514 which may be separate from or integral to the computing-based device 500. The display information provides examples of use in an overlay panel, pop up window or in other ways. In some cases the display information provides a virtual keyboard and optionally other graphical user interfaces. The input/output controller 512 is also arranged to receive and process input from one or more devices, such as a user input device 516 (e.g. a mouse, keyboard, camera, microphone or other sensor). In some examples the user input device 516 detects voice input, user gestures or other user actions and provides a natural user interface (NUI). This user input may be used to select text items for which meanings are sought, to type text into the virtual keyboard 522, to select predicted candidate data items for entry, to give speech commands which select text items for which examples of use are sought and for other purposes. In an embodiment the display device 514 also acts as the user input device 516 if it is a touch sensitive display device. The input/output controller 512 outputs data to devices other than the display device in some examples, e.g. a locally connected printing device.

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A computer-implemented example generator comprising:
a memory storing a text item, examples of use of the text item having been requested;
a processor which searches at least one n-gram language model to identify n-grams containing the text item;
wherein the processor is configured to rank the identified n-grams on the basis of a position of the text item in the identified n-grams; and
a user interface configured to present at least some of the identified n-grams to a user taking into account the ranking.

The example generator of described above wherein the processor searches the n-gram language model and a dynamic model, where the dynamic model comprises n-grams of text items used by the user.

The example generator described above wherein the processor searches at least one dynamic model, where the dynamic model comprises n-grams of text items used by another user.

The example generator described above wherein the processor ranks the identified n-grams on the basis of a length of the n-grams.

The example generator described above wherein the processor ranks the identified n-grams on the basis of a position of the text item in the n-grams being a start or end position.

The example generator described above wherein the processor determines a type of the text item by examining Unicode associated with the text item and/or by carrying out optical character recognition.

The example generator described above wherein, if the processor determines the type of the text item to be one or more of: an emoji, a sticker, an emotion, a hashtag, a place name, a person name; then the processor ranks the identified n-grams by giving n-grams containing the text item as the last entry in the n-gram a higher rank.

The example generator described above wherein, if the processor determines the type of the text item to be a word or phrase then the processor ranks the identified n-grams by giving n-grams containing the text item as the first entry in the n-gram a higher rank.

The example generator described above wherein the processor removes the text item from the identified n-grams before presenting the identified n-grams at the user interface.

A data input system of an electronic device comprising:
a user interface which receives one or more context text items in a sequence of text items input by a user;
a processor which uses at least one n-gram language model and the context text items to predict a next item in the sequence of text items;
the user interface receiving a request for examples of use of one of the predicted next items;
the processor configured to search the n-gram language model to identify n-grams comprising the one of the predicted next items.

The data input system described above wherein the user interface receives the request for examples of use by detecting an extended duration touch input at a candidate key of a virtual predictive keyboard.

The data input system described above wherein the user interface presents the identified n-grams at an overlay panel of the user interface.

The data input system described above wherein the processor inputs one of the predicted next items to the electronic device upon receipt of user input selecting one of the identified n-grams.

The data input system described above wherein the processor is configured such that, if no n-grams are identified, the processor searches a dynamic model which comprises n-grams of recently used text items.

A computer-implemented method of generating examples of use of a text item comprising:
storing, at a memory, a text item where examples of use of the text item have been requested;
searching at least one n-gram language model to identify n-grams containing the text item;
ranking the identified n-grams on the basis of a position of the text item in the identified n-grams;
presenting at least some of the identified n-grams to a user according to the ranking.

The method described above which is carried out as part of an application executing at an electronic device without the need for the user to navigate away from the application, and wherein the application is selected from: a browser, an e-reader, a predictive keyboard, a document authoring application.

The method described above comprising, if no n-grams containing the text item are found in the at least one n-gram language model, then searching a dynamic model comprising n-grams of text items recently used by the or another user.

The method described above comprising determining a type of the text item and ranking the identified n-grams according to a type of the text item and a position of the text item in the n-grams.

The method described above comprising determining a type of the text item by examining Unicode associated with the text item and/or by carrying out optical character recognition.

The method described above carried out at an electronic device and comprising receiving user input selecting one of the presented n-grams and inputting the selected n-gram to the electronic device.

An example apparatus for generating examples of use of a text item comprises:
means for storing, at a memory, a text item where examples of use of the text item have been requested;
means for searching at least one n-gram language model to identify n-grams containing the text item; and
means for presenting at least some of the identified n-grams to a user.

A computer-implemented method of inputting data to an electronic device comprising:
receiving one or more context text items in a sequence of text items input by a user;
using, at a processor, at least one n-gram language model and the context text items to predict a next item in the sequence of text items;
receiving a request for examples of use of one of the predicted next items; and
searching the n-gram language model to identify n-grams comprising the one of the predicted next items.

For example, at least part of one of the identified n-grams is offered to the user together with the predicted next item as a candidate for input to the electronic device.

For example, the memory 206 of FIG. 2 or the memory 508 of FIG. 5 constitute exemplary means for storing a text item where examples of use of the text item have been requested. For example, the processor 204, 502 of FIGS. 2 and 5, when encoded to perform at least some of the operations illustrated in FIG. 3 or FIG. 4, constitutes exemplary means for searching at least one n-gram language model to identify n-grams containing the text item. For example, the user interface 210 of FIG. 2 when encoded to perform at least some of the operations illustrated in FIG. 3 or FIG. 4, constitutes exemplary means for presenting at least some of the identified n-grams to a user.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computer-implemented example generator comprising:
   at least one processor; and
   memory including instructions that, when executed by the at least one processor, cause the at least one processor to:
   receive a request for multiple examples of use of an emoji, wherein the request is entered by a user and the request includes both the emoji and text;
   determine a context based on the text of the request;
   search at least one n-gram language model to identify n-grams corresponding to the context and containing the emoji;
   rank the identified n-grams on a basis of a locational position of the emoji within each respective identified n-gram of the identified n-grams; and
   present to the user at a user interface the multiple examples of use of the emoji, taking into account the ranking, wherein the examples of use are presented in an overlay in response to the request for the multiple examples of use,
   wherein the examples of use of the emoji comprise at least some of the identified n-grams, and wherein the examples of use convey to the user a meaning of the emoji in the context based on the text of the request.

2. The example generator of claim 1 further including instructions to search the n-gram language model and a dynamic model, where the dynamic model comprises n-grams of text items used by the user.

3. The example generator of claim 1 further including instructions to search at least one dynamic model, where the dynamic model comprises n-grams of text items used by another user.

4. The example generator of claim 1 wherein the rank of the identified n-grams is based on a length of the n-grams.

5. The example generator of claim 1 wherein the rank of the identified n-grams is based on a position of the emoji in the n-grams being a start or end position.

6. The example generator of claim 1 further including instructions to identify the emoji by examining Unicode associated with the emoji or by carrying out optical character recognition.

7. The example generator of claim 6 further including instructions to rank the identified n-grams by giving n-grams containing the emoji as the last entry in the n-gram a higher rank.

8. The example generator of claim 1 further including instructions to remove the emoji from the identified n-grams before presenting the identified n-grams at the user interface.

9. A data input system of an electronic device comprising:
   a user interface which receives one or more context text items in a sequence of text items input by a user;
   a processor which uses at least one n-gram language model and the context text items to predict a next item in the sequence of text items;
   the user interface receiving a request for examples of use of an emoji of the predicted next items, wherein the request includes both the emoji and text;
   the processor configured to determine a context based on the context text items;

the processor configured to search the n-gram language model to identify n-grams corresponding to the context and comprising the emoji of the predicted next items;

the processor configured to rank the identified n-grams based on a locational position of the emoji within each respective identified n-gram of the identified n-grams; and the user interface to present to the user examples of use of the emoji, according to the ranking, wherein the examples of use are presented in an overlay in response to the request for examples, wherein the examples of use of the emoji comprise at least some of the identified n-grams, and wherein the examples of use convey to the user a meaning of the emoji in the context based on the text of the request.

10. The data input system of claim 9 wherein the user interface receives the request for examples of use by detecting an extended duration touch input at a candidate key of a virtual predictive keyboard.

11. The data input system of claim 9 wherein the processor inputs one of the predicted next items to the electronic device upon receipt of user input selecting one of the identified n-grams.

12. The data input system of claim 9 wherein the processor is configured such that, if no n-grams are identified, the processor searches a dynamic model which comprises n-grams of recently used text items.

13. A computer-implemented method of generating examples of use of an emoji comprising:

receiving a request for examples of use of the emoji, wherein the request is entered by a user and the request includes both the emoji and text;

determining a context based on the text of the request;

searching at least one n-gram language model to identify n-grams corresponding to the context and containing the emoji;

ranking the identified n-grams on a basis of a locational position of the emoji within each respective identified n-gram of the identified n-grams; and presenting to the user examples of use of the emoji, according to the ranking, wherein the examples of use are presented in an overlay on a user interface in response to the request for examples, wherein the examples of use of the emoji comprise at least some of the identified n-grams, and wherein the examples of use convey to the user a meaning of the emoji in the context based on the text of the request.

14. The method of claim 13 which is carried out as part of an application executing at an electronic device without the need for the user to navigate away from the application, and wherein the application is selected from:

a browser, an e-reader, a predictive keyboard, a document authoring application.

15. The method of claim 13 comprising, if no n-grams containing the emoji are found in the at least one n-gram language model, then searching a dynamic model comprising n-grams of text items recently used by the user or another user.

16. The method of claim 13 comprising identifying the emoji by examining Unicode associated with the emoji or by carrying out optical character recognition.

17. The method of claim 13 carried out at an electronic device and comprising receiving user input selecting one of the presented n-grams and inputting the selected n-gram to the electronic device.

\* \* \* \* \*